United States Patent
Bito

(10) Patent No.: US 9,343,785 B2
(45) Date of Patent: May 17, 2016

(54) VEHICULAR BATTERY COOLING DEVICE THROUGH REAR SEAT

(75) Inventor: Seiji Bito, Hamamatsu (JP)

(73) Assignee: Suzuki Motor Corporation (JP)

( * ) Notice: Subject to any disclaimer, the term of this patent is extended or adjusted under 35 U.S.C. 154(b) by 761 days.

(21) Appl. No.: 13/596,541

(22) Filed: Aug. 28, 2012

(65) Prior Publication Data

US 2013/0092348 A1    Apr. 18, 2013

(30) Foreign Application Priority Data

Oct. 13, 2011    (JP) .................. 2011-225920

(51) Int. Cl.
| | |
|---|---|
| *B60H 1/00* | (2006.01) |
| *H01M 10/6562* | (2014.01) |
| *H01M 10/625* | (2014.01) |
| *H01M 10/613* | (2014.01) |

(52) U.S. Cl.
CPC ........ *H01M 10/6562* (2015.04); *H01M 10/613* (2015.04); *H01M 10/625* (2015.04); *H01M 2220/20* (2013.01)

(58) Field of Classification Search
CPC ............. B60H 1/00564; B60H 1/0055; B60H 1/00278; B60H 2001/00085; B60H 2001/003; B60H 2001/00614; B60H 2001/2293; B60H 2001/2287; H01M 10/6562; H01M 10/613; H01M 10/625; H01M 2220/20
USPC .................. 165/41; 180/68.1, 68.5; 361/690; 296/208, 63; 429/163
See application file for complete search history.

(56) References Cited

U.S. PATENT DOCUMENTS

| | | | |
|---|---|---|---|
| 4,376,408 A * | 3/1983 | Iijima et al. .................. 454/140 |
| 6,315,069 B1 | 11/2001 | Suba et al. | |
| 6,978,856 B2 * | 12/2005 | Nakamura et al. .......... 180/68.4 |
| 8,205,939 B2 * | 6/2012 | Takagi ..................... 297/180.12 |
| 2001/0030069 A1 | 10/2001 | Misu et al. | |
| 2007/0292752 A1 | 12/2007 | Tsuchiya | |

(Continued)

FOREIGN PATENT DOCUMENTS

| | | |
|---|---|---|
| CN | 101090837 A | 12/2007 |
| CN | 101522459 A | 9/2009 |

(Continued)

OTHER PUBLICATIONS

German Office Action for Application No. 102012020103 dated Jul. 26, 2013.
Chinese Office Action for Application No. 201210339943.8 dated Jul. 3, 2014.

*Primary Examiner* — Travis Ruby
(74) *Attorney, Agent, or Firm* — Lerner, David, Littenberg, Krumholz & Mentlik, LLP

(57) ABSTRACT

A vehicular battery cooling device in which a rear seat is disposed on the upper surface of a rear floor panel, a battery pack is disposed on the upper surface of the rear floor panel at the rear of the rear seat, and an air intake duct extending from the battery pack to the vehicle front is installed between the cushion part of the rear seat and the rear floor panel. A concave part extending in the vehicle longitudinal direction is formed in the lower surface of the cushion part in the central portion in the vehicle width direction, an opening is formed at the front end of the air intake duct, and the air intake duct is formed so as to have a strength capable of supporting the weight of a passenger and is brought into contact with the lower surface of the cushion part.

2 Claims, 5 Drawing Sheets

(56) References Cited

U.S. PATENT DOCUMENTS

| | | |
|---|---|---|
| 2008/0296075 A1 | 12/2008 | Zhu et al. |
| 2008/0296935 A1 | 12/2008 | Mangiapane et al. |
| 2008/0297136 A1* | 12/2008 | Gaboury et al. ........... 324/76.11 |
| 2009/0256523 A1 | 10/2009 | Taguchi |
| 2010/0099019 A1 | 4/2010 | Nagata et al. |
| 2010/0294580 A1* | 11/2010 | Kubota et al. ................ 180/68.1 |
| 2014/0023892 A1* | 1/2014 | Lim et al. ........................ 429/71 |

FOREIGN PATENT DOCUMENTS

| | | |
|---|---|---|
| CN | 101687460 A | 3/2010 |
| DE | 60007199 T2 | 6/2004 |
| DE | 60128619 T2 | 1/2008 |
| DE | 102008022772 A1 | 12/2008 |
| JP | 2004001683 A | 1/2004 |
| JP | 2007294290 A | 11/2007 |

* cited by examiner

VEHICULAR BATTERY COOLING DEVICE THROUGH REAR SEAT

CROSS-REFERENCE TO RELATED APPLICATIONS

The present application claims priority from Japanese Patent Application No. 2011-225920 filed Oct. 13, 2011, the disclosure of which is hereby incorporated herein by reference.

FIELD OF THE INVENTION

The present invention relates to a vehicular battery cooling device. More particularly, it relates to a vehicular battery cooling device in which an air intake duct for sending cooling air to a battery pack disposed at the rear of a rear seat can be installed without requiring major changes of peripheral parts.

BACKGROUND OF THE INVENTION

A vehicle of a type such as to be run by using an electric motor as a driving source, such as an electric vehicle or a hybrid vehicle, is mounted with a battery pack that stores batteries for running the vehicle. In the battery pack, when the batteries are charged or discharged, heat is generated from cells constituting each of the batteries. To prevent the cell performance from being deteriorated by heat, the heat generated by the cooling of batteries must be removed.

As one means for cooling the batteries, there has conventionally been available a cooling device in which the air in a vehicle compartment is taken in via an air intake duct, and the taken-in air is supplied to the batteries as cooling air by using an air blowing fan or the like.

In some of the conventional vehicular battery cooling devices, an air intake duct extending from a battery pack disposed on a rear floor panel at the rear of a rear seat to one side in the vehicle width direction is installed in a side wall of a vehicle body located at the side of a backrest part of the rear seat, the opening of the air intake duct is formed in an upper portion of a side garnish at the side of the backrest part of the rear seat, and the air in the vehicle compartment is taken into the air intake duct through this opening and is supplied to the batteries as cooling air by using an air blowing fan or the like (JP 4114478 B).

Also, in some of the conventional vehicular battery cooling devices, an air intake duct extending from a battery pack disposed on a rear floor panel at the rear of a rear seat to the vehicle front direction is installed between the cushion part of the rear seat and the rear floor panel, an opening is formed at the front end of the air intake duct extended to the vehicle front direction, and the air in the vehicle compartment is taken into the air intake duct through this opening and is supplied to the batteries as cooling air by using an air blowing fan or the like (JP 2007-294290 A).

BRIEF SUMMARY OF THE INVENTION

In the cooling device disclosed in JP 4114478 B, the opening for drawing air into the air intake duct is formed in the upper portion of the side garnish at the side of the backrest part of the rear seat. In this structure, since the opening is disposed at a relatively high position in the vehicle compartment, high-temperature air in the upper portion of the vehicle compartment is taken in, so that it is difficult to remove heat generated from the batteries. Also, since the opening is disposed at a height close to the ear of a passenger seated on the rear seat, the wind noise of the air taken in through the opening enters the passenger's ear, and makes the passenger uncomfortable. Further, since the air intake duct is formed with the opening in the upper portion of the side garnish and is incorporated into the side wall of the vehicle body, the parts arranged at the periphery of the air intake duct must be changed significantly.

In the cooling device disclosed in JP 2007-294290 A, the air intake duct is installed between the cushion part of the rear seat and the rear floor panel. In this structure, since a gap is provided between the air intake duct and the cushion part of rear seat above the air intake duct, a reinforcing member for supporting the cushion part must be provided under the cushion part of rear seat, and there arises a problem that the height of the cushion part of rear seat increases, and therefore the seating position of the passenger becomes high.

An object of the present invention is to provide a vehicular battery cooling device in which an air intake duct for sending cooling air to a battery pack can be installed under a rear seat without requiring major changes of peripheral parts and without making the seating position of a passenger high.

The present invention provides a vehicular battery cooling device for a vehicle, the vehicle having: a front floor panel; an elevation part rising at the rear of the front floor panel; a rear floor panel extending from the upper end of the elevation part to the rear; a rear seat disposed on the rear floor panel; and a battery pack for storing batteries, which is disposed on the rear floor panel at the rear of the rear seat, the battery cooling device comprising an air intake duct which extends from the battery pack to the front direction passing through a portion between the cushion part of the rear seat and the rear floor panel, and which is open to a vehicle compartment to take the air in the vehicle compartment into the battery pack, wherein a concave part extending in the vehicle longitudinal direction is formed in the lower surface of a central portion in the vehicle width direction of the cushion part; and the air intake duct extends from the battery pack so as to fit in the concave part, is open to the vehicle compartment, is provided with a strength capable of supporting the weight of a passenger, and is disposed so as to be in contact with the inner surface of the concave part in the cushion part.

The vehicular battery cooling device in accordance with the present invention has a configuration such that the air intake duct for taking the air in the vehicle compartment into the battery pack extends to the vehicle front through the concave part formed in the lower surface of the cushion part, is provided with a strength capable of supporting the weight of the passenger, and is brought into contact with the lower surface of the cushion part. Therefore, the air intake duct for sending cooling air to the battery pack can be installed between the cushion part of the rear seat and the rear floor panel without requiring major changes of peripheral parts and without making the seating position of the passenger high.

Also, the vehicular battery cooling device in accordance with the present invention is formed with the opening at the front end of the air intake duct installed between the cushion part of the rear seat and the rear floor panel. Therefore, the rise in temperature of air due to solar radiation is small, and the opening can be formed in the lower portion of the vehicle compartment so that the air intake sound is less liable to reach the passenger's ear.

Further, the vehicular battery cooling device in accordance with the present invention is configured so that the air intake duct is installed in the central portion in the vehicle width direction of the cushion part of the rear seat. Therefore, the overall length of the air intake duct can be decreased to reduce the passage resistance, and the battery pack can be cooled efficiently.

DETAILED DESCRIPTION OF THE INVENTION

An embodiment of the present invention will now be described with reference to the accompanying drawings.

Figure 1:
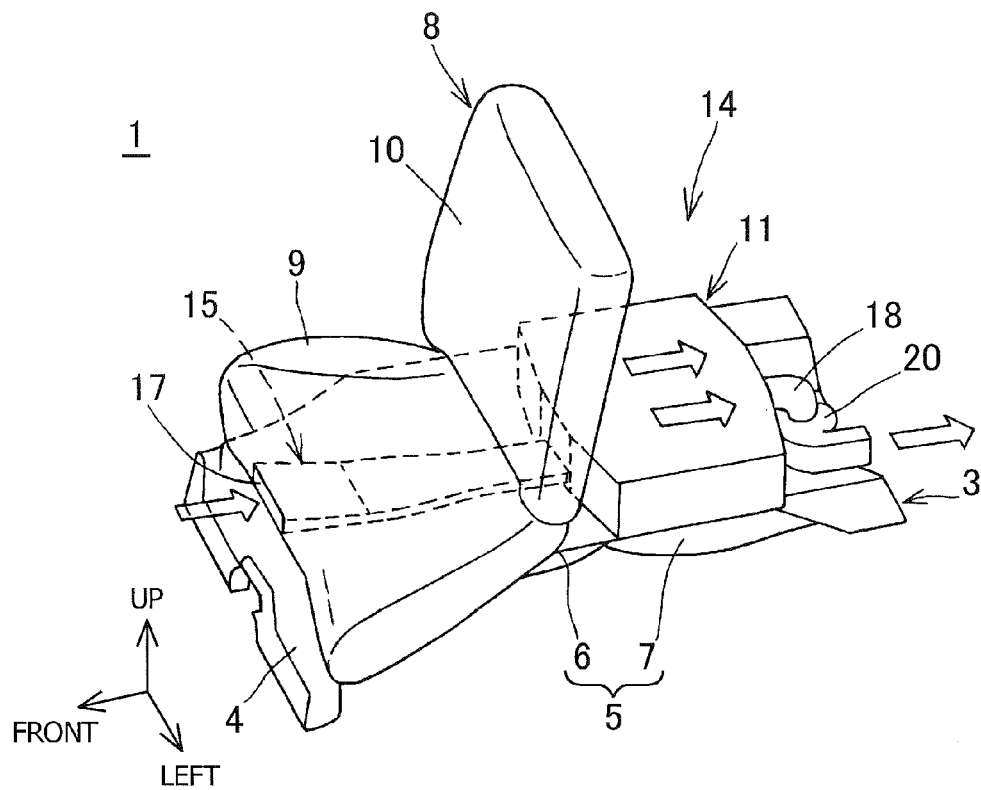
FIG. 1 is a perspective view of a vehicular battery cooling device.
Figure 2:
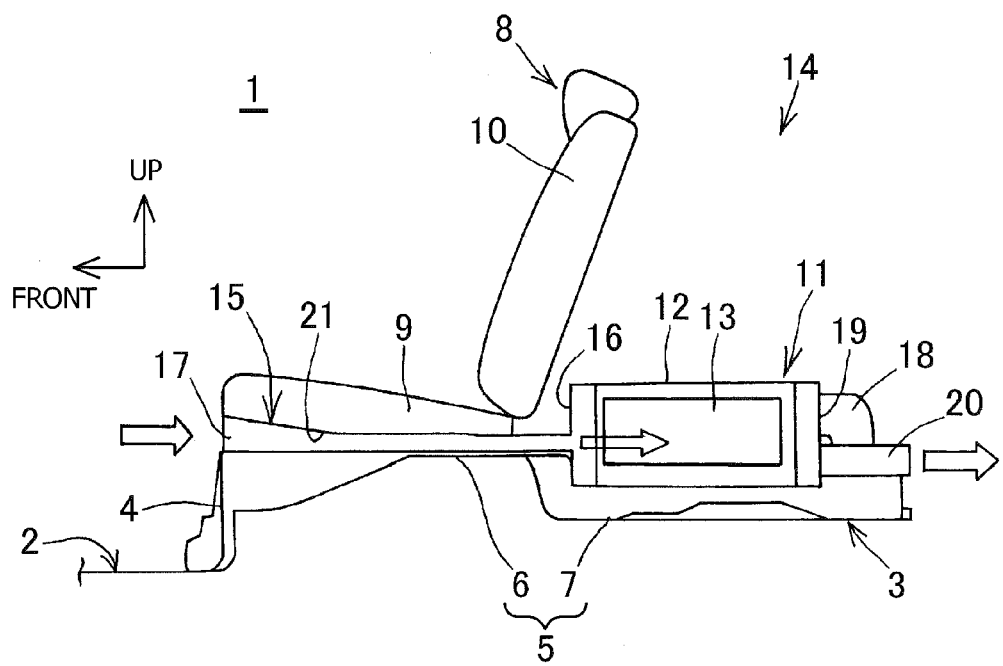
FIG. 2 is a sectional view of the vehicular battery cooling device shown in FIG. 1.
Figure 3:
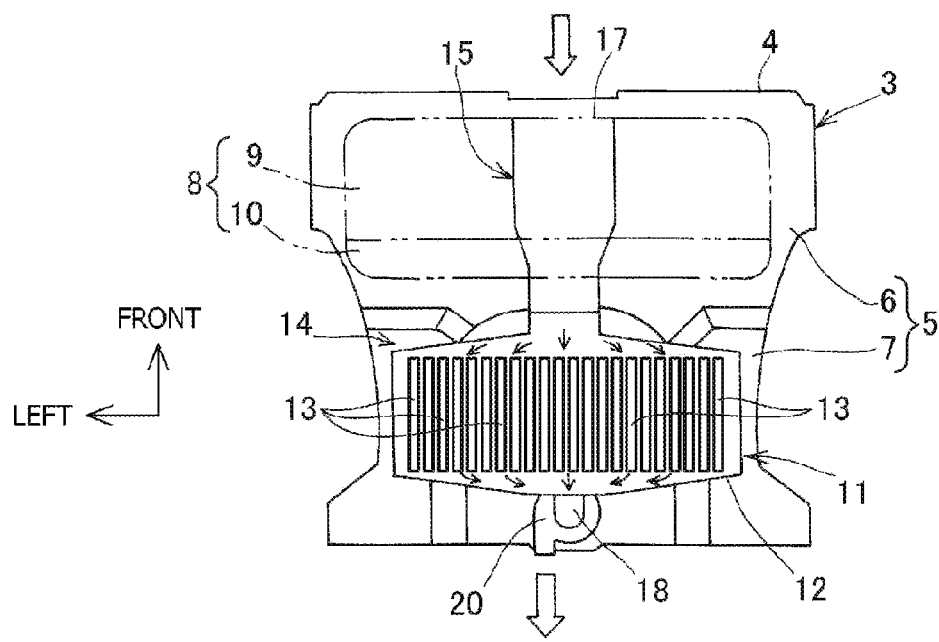
FIG. 3 is a plan view of the vehicular battery cooling device shown in FIG. 1.

FIGS. 1 to 8 show the embodiment. In FIGS. 1 to 3, reference sign 1 denotes a vehicle compartment, 2 denotes a front floor panel, and 3 denotes a rear floor panel. In the vehicle compartment 1, the rear floor panel 3 extending to the vehicle rear direction continuously with the front floor panel 2 is provided. The rear floor panel 3 includes a vertical wall part 4 (an elevation part) rising in the vehicle upper direction from an end portion in the vehicle rear direction of the front floor panel 2, and also includes an upper floor part 5 extending horizontally from the upper end of the vertical wall part 4 to the vehicle rear direction.

The upper floor part 5 of the rear floor panel 3 consists of a front-side part 6 that extends in the vehicle longitudinal direction and is continuous with the vertical wall part 4 and a rear-side part 7 that extends in the vehicle longitudinal direction and is continuous with the front-side part 6. On the upper surface of the front-side part 6, a rear seat 8 is disposed. The rear seat 8 consists of a cushion part 9 attached to the front-side part 6 and a backrest part 10 attached to the rear end of the cushion part 9. In the central portion in the vehicle width direction of the rear-side part 7 at the rear of the rear seat 8, a battery pack 11 is disposed. The battery pack 11 stores a plurality of batteries 13 in a battery case 12 having a square box shape. Each of the batteries 13 is formed into a quadrangular prism shaped module in which a plurality of cells are combined and integrated.

The battery pack 11 is provided with a vehicular battery cooling device 14 for cooling the batteries 13 stored in the battery case 12. The vehicular battery cooling device 14 extends from the battery case 12 of the battery pack 11 to the vehicle front direction, and is provided with an air intake duct 15 for taking the air in the vehicle compartment 1 into the battery pack 11. The air intake duct 15 is configured so that the rear end thereof connects with a front wall 16 of the battery case 12, the middle portion thereof extends to the vehicle front direction and is disposed between the cushion part 9 of the rear seat 8 and the front-side part 6 of the rear floor panel 3, and an opening 17 that is open toward the vehicle front direction is provided at the front end thereof.

The vehicular battery cooling device 14 is provided with an air exhaust duct 18 for exhausting the air in the battery case 12 of the battery pack 11 to the vehicle rear direction. The air exhaust duct 18 is configured so that the front end thereof connects with a rear wall 19 of the battery case 12, and a cooling fan 20 is connected to the rear end thereof. The vehicular battery cooling device 14 takes air into the battery case 12 through the air intake duct 15 by the attraction force of the cooling fan 20 to cool the batteries 13, and exhausts the heated air to the vehicle rear direction through the air exhaust duct 18.

Figure 4A:
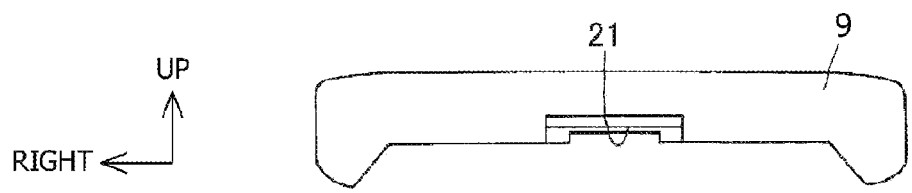
FIG. 4(A) is a front view of the cushion part of a rear seat.
Figure 4B:
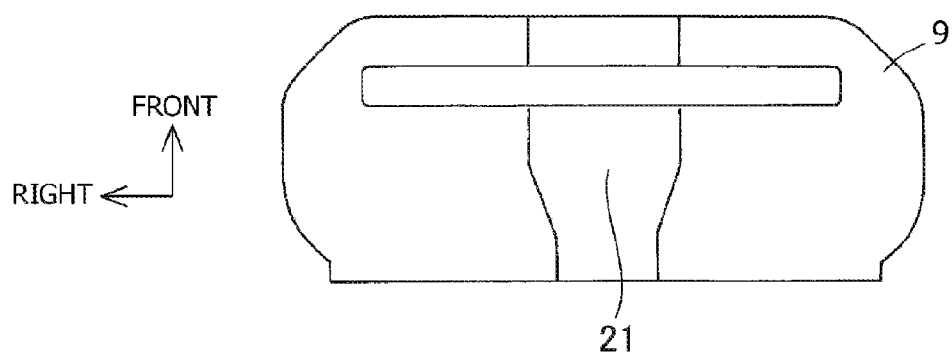
FIG. 4(B) is a bottom view of the cushion part of the rear seat.
Figure 5:
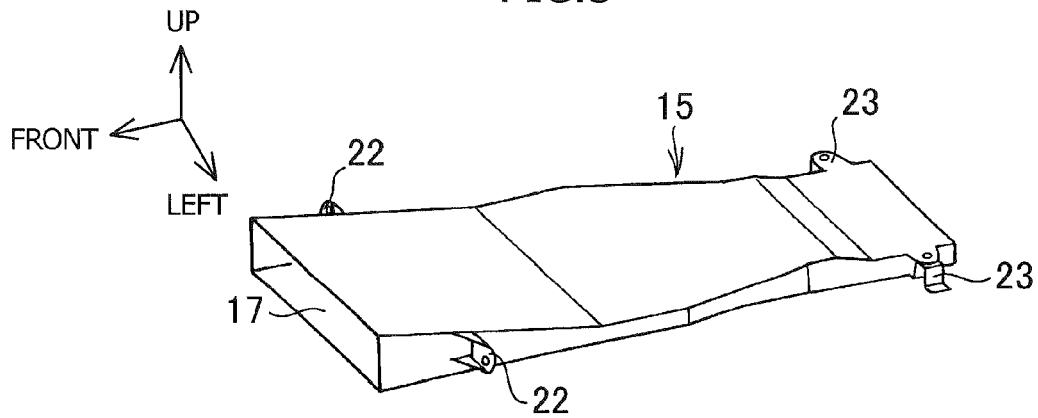
FIG. 5 is a perspective view of an air intake duct.

As shown in FIG. 4, in the vehicular battery cooling device 14, a concave part 21 that extends in the vehicle longitudinal direction and is flat in the up-and-down direction is formed in the lower surface of the cushion part 9 of the rear seat 8 in the central portion in the vehicle width direction of the cushion part 9. As shown in FIG. 5, the air intake duct 15 has a shape that is flat in the up-and-down direction and substantially rectangular so as to fit in the concave part 21, and is provided with a strength capable of supporting the weight of the passenger by selecting the material and cross-sectional shape. The air intake duct 15 has front-side attachment parts 22 on the front side thereof in the lengthwise direction, and has rear-side attachment parts 23 on the rear side thereof in the lengthwise direction.

Figure 6A:
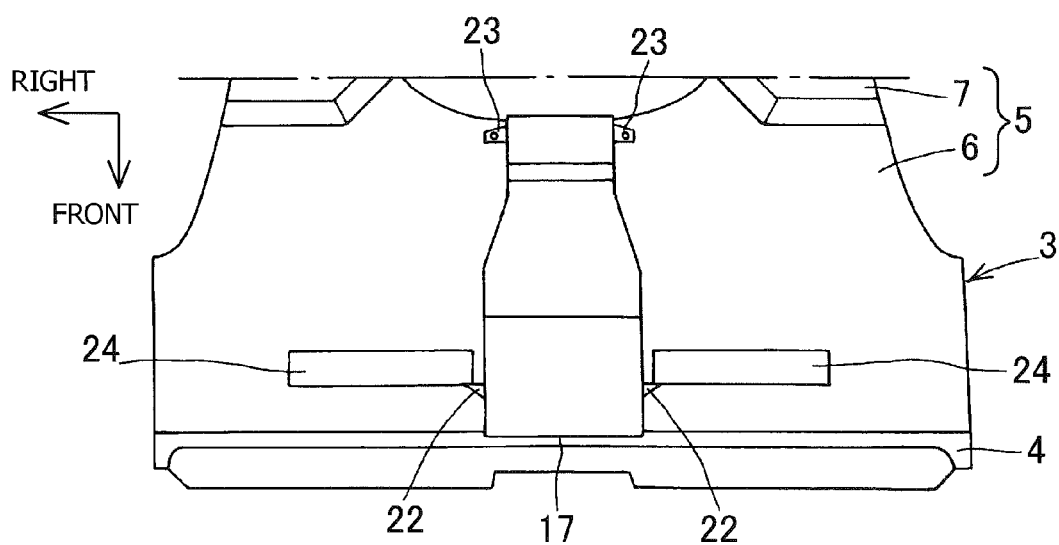
FIG. 6(A) is a plan view of an air intake duct installed on a rear floor panel.
Figure 6B:
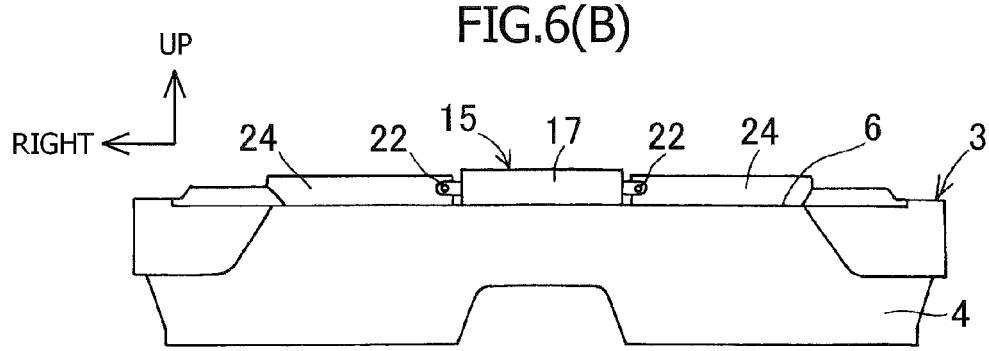
FIG. 6(B) is a front view of the air intake duct installed on the rear floor panel.
Figure 7:
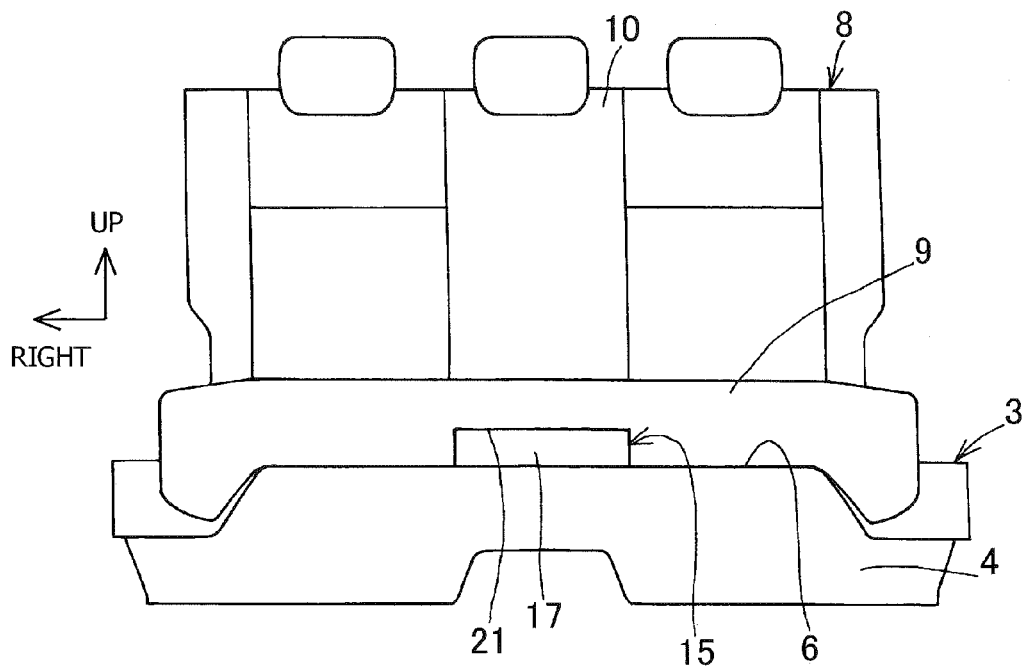
FIG. 7 is a front view of a rear seat, showing an opening of an air intake duct.

As shown in FIG. 6, the air intake duct 15 is placed in the central portion in the vehicle width direction on the upper surface of the front-side part 6 of the rear floor panel 3 with the lengthwise direction thereof being directed to the vehicle longitudinal direction, the front-side attachment parts 22 thereof are attached to brackets 24 fixed onto the rear floor panel 3, and the rear-side attachment parts 23 on the rear side thereof in the lengthwise direction are attached to the front-side part 6 of the rear floor panel 3. Thereby, as shown in FIGS. 1 and 2, the air intake duct 15 is disposed so as to extend from the battery pack 11 through the concave part 21 in the cushion part 9 with the lengthwise direction thereof being directed to the vehicle front direction. As shown in FIG. 7, at the front end of the air intake duct 15 extending to the vehicle front direction in between the rear floor panel 3 and the cushion part 9, the opening 17 is formed to take in the air in the vehicle compartment 1. Also, the air intake duct 15 is provided with a strength capable of supporting the weight of the passenger, and is brought into contact with the lower surface in the concave part 21 of the cushion part 9.

Thus, the vehicular battery cooling device 14 has a configuration such that the air intake duct 15 for taking the air in the vehicle compartment 1 into the battery pack 11 extends to the vehicle front through the concave part 21 formed in the lower surface of the cushion part 9, is provided with a strength capable of supporting the weight of the passenger, and is brought into contact with the lower surface of the cushion part 9. Therefore, the air intake duct 15 for sending cooling air to the battery pack 11 can be installed between the cushion part 9 of the rear seat 8 and the rear floor panel 3 without requiring major changes of peripheral parts and without making the seating position of the passenger high.

Also, the vehicular battery cooling device 14 is formed with the opening 17 at the front end of the air intake duct 15 installed between the cushion part 9 of the rear seat 8 and the rear floor panel 3. Therefore, the rise in temperature of air due to solar radiation is small, the opening 17 can be formed in the lower portion of the vehicle compartment so that the air intake sound is less liable to reach the passenger's ear, the heat generated from the batteries 13 can be removed easily, and the passenger does not become uncomfortable.

Further, the vehicular battery cooling device 14 is configured so that the air intake duct 15 is installed in the central portion in the vehicle width direction of the cushion part 9 of the rear seat 8. Therefore, the overall length of the air intake duct 15 can be decreased to reduce the passage resistance, and the battery pack 11 can be cooled efficiently.

Figure 8:
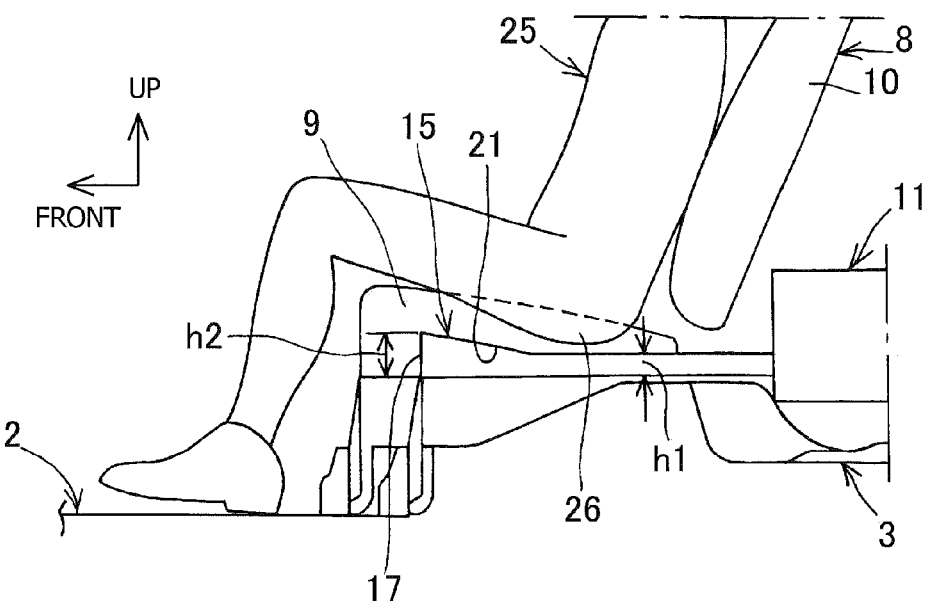
FIG. 8 is a sectional view of a vehicular battery cooling device, showing the relationship between the buttocks of a passenger and an air intake duct.

For this vehicular battery cooling device 14, as shown in FIG. 8, the height dimension of the air intake duct 15 is made such that the portion in the vehicle rear of the lower portion of the buttocks 26 of a passenger 25 seated in the central portion in the vehicle width direction of the cushion part 9 of the rear seat 8 has a constant height of h1, and on the other hand, in the portion close to the opening 17 in the vehicle front of the buttocks 26 of the seated passenger 25, the height is increased gradually according to the increase in height of the cushion part 9, and at the opening 17, the height is at a maximum, being h2.

Thus, the vehicular battery cooling device 14 is configured so that the air intake duct 15 has the constant height of h1 in the portion in the vehicle rear of the lower portion of the buttocks 26 of the passenger 25 seated in the cushion part 9 of the rear seat 8. Thereby, the thickness of the cushion part 9 that supports the buttocks 26 of the passenger 25 can be prevented from decreasing, and the comfortability of the passenger 26 can be ensured.

At the time of emergency braking of vehicle, an inertial force to the vehicle front acts on the passenger 26 seated in the central portion in the vehicle width direction of the cushion part 9 of the rear seat 8. However, because the vehicular battery cooling device 14 is configured so that in the portion close to the opening 17 in the vehicle front of the buttocks 26 of the passenger 25 seated in the cushion part 9 of the rear seat 8, the height of the air intake duct 15 is increased according to the increase in height of the cushion part 9, the deformation of the cushion part 9 in the vehicle front of the buttocks 26 of the passenger 25 can be restrained by the air intake duct 15, so that the passenger 25 can be prevented from being moved to the front.

In the vehicular battery cooling device 14, as shown in FIGS. 2 and 3, the arrangement of the batteries 13 in the battery pack 11 is specified. The battery pack 11 stores the plurality of batteries 13 each formed into the quadrangular prism shaped module. The plurality of batteries 13 are arranged in the battery case 12 so that the lengthwise direction thereof is directed to the vehicle longitudinal direction, and a gap is provided therebetween.

Thereby, in this vehicular battery cooling device 14, cooling air can be introduced linearly into the battery case 12 through the air intake duct 15 under the rear seat 8, the passage through which the cooling air flows in the battery case 12 can be made shortest, the pressure loss can be reduced, and therefore the batteries 13 can be cooled with high efficiency.

Figure 9:
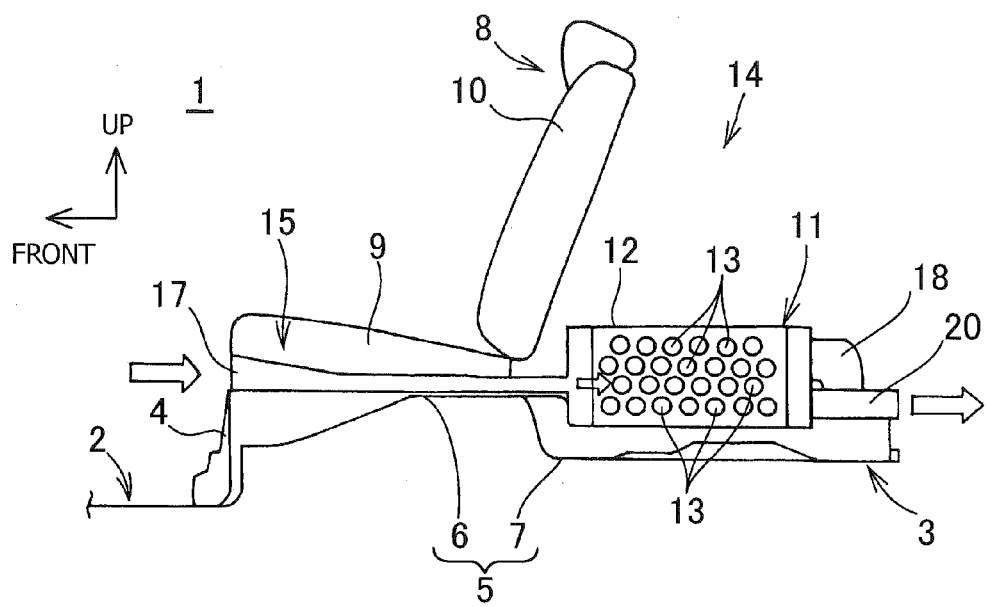
FIG. 9 is a sectional view of a vehicular battery cooling device.
Figure 10:
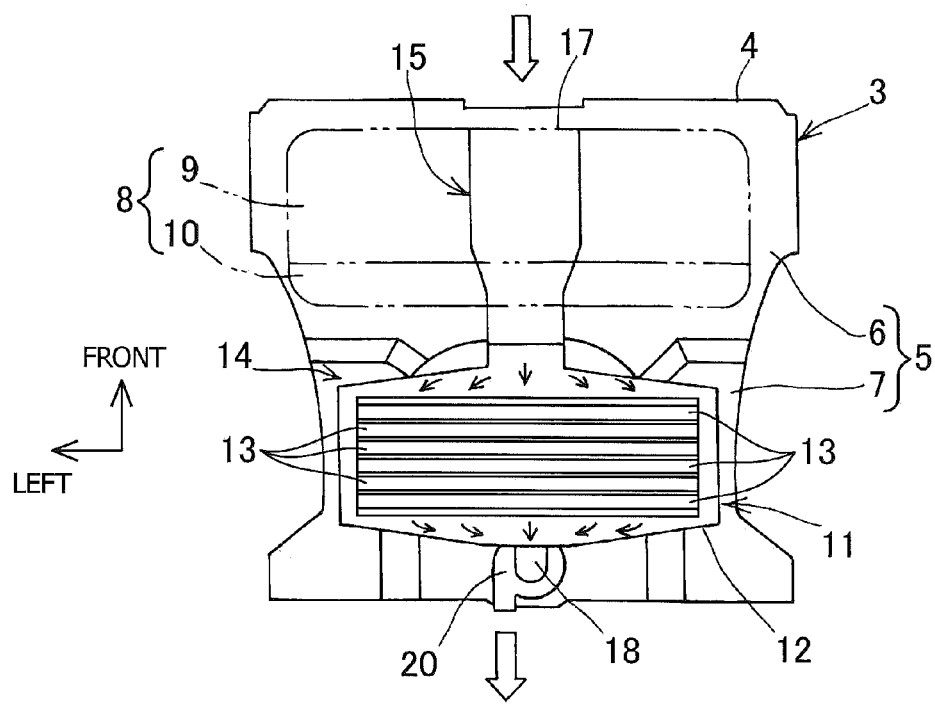
FIG. 10 is a plan view of the vehicular battery cooling device shown in FIG. 9.

FIGS. 9 and 10 show a modification of the arrangement structure of the batteries 13 in the battery pack 11. The battery pack 11 stores the plurality of batteries 13 each formed into a cylindrically shaped module. The plurality of batteries 13 are arranged in the battery case 12 so that the lengthwise direction thereof is directed to the vehicle width direction, and a gap is provided therebetween.

Thereby, in this vehicular battery cooling device 14, cooling air can be introduced linearly into the battery case 12 through the air intake duct 15 under the rear seat 8, the passage through which the cooling air flows in the battery case 12 can be made shortest, the pressure loss can be reduced, and therefore the batteries 13 can be cooled with high efficiency.

The present invention, in which the air intake duct for sending cooling air to the battery pack can be installed under the rear seat without requiring major changes of peripheral parts and without making the seating position of a passenger high, can be applied to not only the cooling of batteries but also the cooling of equipment disposed at the rear of the rear seat.

What is claimed is:

1. A vehicular battery cooling device for a vehicle, the vehicle having:
    a front floor panel;
    an elevation part rising at a rear of the front floor panel;
    a rear floor panel which includes an upper floor part extending from an upper end of the elevation part to the rear;
    a rear seat disposed on the rear floor panel; and
    a battery pack for storing batteries, which is disposed on the rear floor panel at the rear of the rear seat,
    the battery cooling device comprising an air intake duct which extends forward from the battery pack passing through a portion between a cushion part of the rear seat and the rear floor panel, and which has an opening at a front end thereof being open to a vehicle compartment to take air in the vehicle compartment into the battery pack,
    wherein:
    the air intake duct is formed in substantially rectangular cross-section tubular shape, has a planar bottom surface and constant height dimension on a rear side corresponding to a seat surface rear part of the cushion part, and has an inclination such that the height increases to a front side corresponding to a seat surface front part of the cushion part, and has a strength capable of supporting a passenger's weight, and is placed in the central portion in a vehicle width direction on a top surface of the rear floor panel; and
    the cushion part is formed with a concave part, for housing the air intake duct, extending in a vehicle longitudinal direction in a bottom surface of a central portion in the vehicle width direction of the cushion part, and is disposed on the rear floor panel so that an inner surface of the concave part is in contact with the top surface of the air intake duct.

2. The vehicular battery cooling device according to claim 1, wherein the air intake duct has attachment parts on both sides thereof in the vehicle width direction to be attached to brackets fixed onto the rear floor panel.

* * * * *